(12) United States Patent
Doetsch et al.

(10) Patent No.: US 6,765,951 B2
(45) Date of Patent: Jul. 20, 2004

(54) METHOD FOR ESTIMATING THE CHANNEL IMPULSE RESPONSE OF A MOBILE RADIO CHANNEL

(75) Inventors: Markus Doetsch, Schliern (CH); Peter Jung, Otterberg (DE); Jörg Plechinger, München (DE); Peter Schmidt, Erpolzheim (DE); Michael Schneider, München (DE); Tideya Kella, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/047,614

(22) Filed: Jan. 15, 2002

(65) Prior Publication Data

US 2002/0150073 A1 Oct. 17, 2002

Related U.S. Application Data

(63) Continuation of application No. PCT/DE00/02259, filed on Jul. 11, 2000.

(30) Foreign Application Priority Data

Jul. 15, 1999 (DE) ......................................... 199 33 271

(51) Int. Cl.[7] .......................... H04B 15/30; H04K 1/00; H04L 27/30
(52) U.S. Cl. ...................... 375/130; 375/224; 370/320
(58) Field of Search .............................. 375/130, 140, 375/142, 145, 149, 267, 316, 347, 349, 224, 260, 367; 370/335, 503, 507, 509, 513, 514, 515, 516, 320; 455/504, 506

(56) References Cited

U.S. PATENT DOCUMENTS

| | | | |
|---|---|---|---|
| 5,602,832 A | 2/1997 | Hudson | |
| 5,764,687 A | 6/1998 | Easton | |
| 5,818,866 A | 10/1998 | Wilk | |
| 6,215,814 B1 * | 4/2001 | Ylitalo et al. | 375/148 |
| 6,330,271 B1 * | 12/2001 | Klang et al. | 375/134 |
| 6,363,104 B1 * | 3/2002 | Bottomley | 375/148 |
| 6,414,988 B1 * | 7/2002 | Ling | 375/150 |
| 6,430,166 B1 * | 8/2002 | Bejjani et al. | 370/320 |
| 6,470,001 B1 * | 10/2002 | Kim et al. | 370/342 |
| 6,496,494 B1 * | 12/2002 | Perrin et al. | 370/335 |
| 6,529,545 B2 * | 3/2003 | Tiirola et al. | 375/148 |
| 2002/0051485 A1 * | 5/2002 | Bottomley | 375/147 |

FOREIGN PATENT DOCUMENTS

| | | |
|---|---|---|
| EP | 0 704 987 A2 | 4/1996 |
| EP | 0 749 215 A2 | 12/1996 |
| EP | 0 876 002 A2 | 11/1998 |
| WO | WO 99/12273 | 3/1999 |

OTHER PUBLICATIONS

"Maximum Likelihood Multipath Channel Estimation for Synchronous–CDM Systems" (Franchi et al.), IEEE, Nov. 28, 1994, pp. 88–92.

* cited by examiner

Primary Examiner—Jean B. Corrielus
(74) Attorney, Agent, or Firm—Laurence A. Greenberg; Werner H. Stemer; Ralph E. Locher

(57) ABSTRACT

A method for estimating a channel impulse response of a mobile radio channel is described. The mobile radio channel is accessed over a wide bandwidth by a code division multiplex method. A second mobile radio channel continuously transmits sequences to a multiplicity of mobile radio receivers, and the sequences are known to each of the multiplicity of mobile radio receivers. The delay parameters of the mobile radio channel are estimated using the sequences transmitted via the second mobile radio channel. The mobile radio receiver is adjusted in accordance with the delay parameters estimated and weighting factors of the mobile radio channel are determined.

11 Claims, 2 Drawing Sheets

METHOD FOR ESTIMATING THE CHANNEL IMPULSE RESPONSE OF A MOBILE RADIO CHANNEL

CROSS-REFERENCE TO RELATED APPLICATION

This application is a continuation of copending International Application No. PCT/DE00/02259, filed Jul. 11, 2000, which designated the United States.

BACKGROUND OF THE INVENTION

Field of the Invention

The invention relates to a method for estimating the channel impulse response of a mobile radio channel. To achieve good transmission quality in mobile radio systems, knowledge of the channel impulse response of a mobile radio channel is of particular significance. It is only by this knowledge that a signal transmitted via the mobile radio channel can be sufficiently equalized for subsequent evaluation in a receiver. The more precisely the channel impulse response of the mobile radio channel is known to the receiver, the better a received signal can be equalized and evaluated.

To estimate the channel impulse response, the maximum likelihood method is used, for example, in narrow-band systems such as the global system for mobile communications (GSM) and Qualcomm code division multiple access (CDMA) according to the IS-95 standard. In particular, the maximum likelihood method is suitable for narrow-band systems having few users per frequency resource.

For example, in GSM systems, a narrow-band frequency slot of 200 kHz is always used only by one user at a particular time. Within the time slot available to a user, a base station transmits a test signal that is known to the mobile radio receiver of the user. Using the test signal, the mobile radio receiver estimates the channel impulse response of the mobile radio channel in accordance with the maximum likelihood method. The estimate supplies both the delay parameters and the weighting factors of the mobile radio channel that are necessary for efficient equalization.

In Qualcomm CDMA systems according to IS-95 standard, up to 63 users can simultaneously transmit and receive in a frequency band of 1.25 MHz. On average, 20 to 25 users are simultaneously transmitting and receiving in such a system. The channel impulse response of the mobile radio channel is estimated via a separate pilot channel that consists of a pseudo random binary sequence characteristic of the channel with a chip rate of 1.2288 Mchip/s and does not have any channel coding.

In mobile radio systems having a greater bandwidth available for transmission, particularly CDMA mobile radio systems, however, the number of samples within a predetermined time frame that are necessary for decoding in a mobile radio receiver is increased so that the calculating effort for a decoding method based on the maximum likelihood method is greatly increased.

In broadband mobile radio systems such as, for example, wide band CDMA (W-CDMA), the number of users that are simultaneously transmitting and receiving is also greater than in narrowband systems. Theoretically, W-CDMA allows more than 250 users in a 5 MHz frequency band. This further increases the calculating effort for a maximum likelihood method.

In Published, European Patent Application EP 0 876 002 A, representing the nearest prior art, a method for channel estimation is described in which the delay parameters are estimated by use of pilot sequences and the RAKE fingers are adjusted in accordance with the delay times thus determined. With regard to the determination of the channel or weighting parameters, the document shows that these are calculated from the pilot symbols.

In Published, European Patent Application EP 0 704 987 A2, a method is described in which the predetermined PN-offset of a base station, and thus the time difference between a system time and a time of emission of the pilot signal by the base station is determined in a receiver by evaluating a synchronization sequence transmitted via a synchronization channel.

SUMMARY OF THE INVENTION

It is accordingly an object of the invention to provide a method for estimating the channel impulse response of a mobile radio channel which overcomes the above-mentioned disadvantages of the prior art methods of this general type, in which the calculating requirement of the method is less than the calculating effort of a maximum likelihood method. Furthermore, it should be possible to determine the transmission quality to be achieved.

With the foregoing and other objects in view there is provided, in accordance with the invention, a method for estimating a channel impulse response of a first mobile radio channel accessed over a wide bandwidth by use of a code division multiplex method. The method includes transmitting continuously sequences for synchronizing a mobile radio receiver to a multiplicity of mobile radio receivers via a second mobile radio channel functioning as a synchronization channel and in which the sequences are known to each of the multiplicity of mobile radio receivers. The sequences transmitted via the synchronization channel are used for estimating delay parameters of the first mobile radio channel caused by multipath propagation. The mobile radio receiver is adjusted in accordance with the delay parameters derived, and weighting factors are estimated for the first mobile radio channel.

In the method, the delay parameters of the mobile radio channel are estimated by use of the sequences transmitted via the synchronization channel.

The multi-stage method exhibits as essential steps the estimating of the delay parameters of the mobile radio channel followed by the estimating of the weighting factors of the mobile radio channel. The two-stage estimating of the mobile radio channel parameters requires less calculating effort than, for example, the maximum likelihood method. Furthermore, the calculating effort for estimating the weighting factors of the mobile radio channel can be correspondingly adapted to the transmission quality to be achieved by the two-stage estimating.

The synchronization channel used for estimating the delay times in accordance with the invention is always present in mobile radio systems with the code division multiplex method. Since known sequences are transmitted via the synchronization channel, the channel is suitable for estimating the delay parameters. At the same time, a mobile radio receiver can be synchronized.

Estimating the delay parameters of the mobile radio channel is preferably carried out by a correlation method which utilizes the correlation characteristics of the sequences transmitted via the synchronization channel.

In particular, the transmitted sequences correspond to gold sequences. The gold sequences advantageously exhibit particularly good cross-correlation characteristics and are, therefore, well suited to mobile radio systems using the code division multiplex method. In such mobile radio systems, uncorrelated noise sequences that, however, cannot be technically achieved, should be available for optimum decoding in a mobile radio receiver. The gold sequences advantageously closely approximate the uncorrelated noise sequences.

The estimating of the delay parameters of the mobile radio channel is ideally carried out after an initial synchronization of a mobile radio receiver. In this configuration, the result of the estimating can be even more accurate since the mobile radio receiver is already adjusted to the transmission frequency and is receiving signals more effectively.

The estimating of the delay parameters of the mobile radio channel is preferably carried out by evaluating the strongest signals among the received signals. In this configuration, the frequency diversity of the transmission signals is utilized. The transmitted signals have such a bandwidth that they spread over a number of transmission paths in the mobile radio channel due to the frequency diversity. Each of the transmission paths has a different transfer function. By taking into consideration only the strongest among the received signals, the calculating effort is advantageously reduced compared with a consideration of all received signals.

In particular, the estimating of the weighting factors of the mobile radio channel is carried out by pilot sequences which are transmitted via a third mobile radio channel and a fourth mobile radio channel. In W-CDMA mobile radio systems, the broadcast control channel (BCCH) can be used as a third mobile radio channel and the dedicated physical channel (DPCH) can be used as the fourth mobile radio channel.

The estimating of the weighting factors of the mobile radio channel is preferably carried out during an acquisition. In this configuration, in particular, a spread-spectrum code previously used for synchronization is used.

As an alternative, the estimating of the weighting factors of the mobile radio channel is carried out in accordance with a method of pilot integration. Furthermore, the estimating of the weighting factors of the mobile radio channel can be carried out by a phase tracking algorithm.

To carry out the method, a RAKE receiver with adaptive fingers is provided in a mobile radio receiver, the RAKE receiver being adjusted via the determined weighting factors of the mobile radio channel.

Other features which are considered as characteristic for the invention are set forth in the appended claims.

Although the invention is illustrated and described herein as embodied in a method for estimating the channel impulse response of a mobile radio channel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
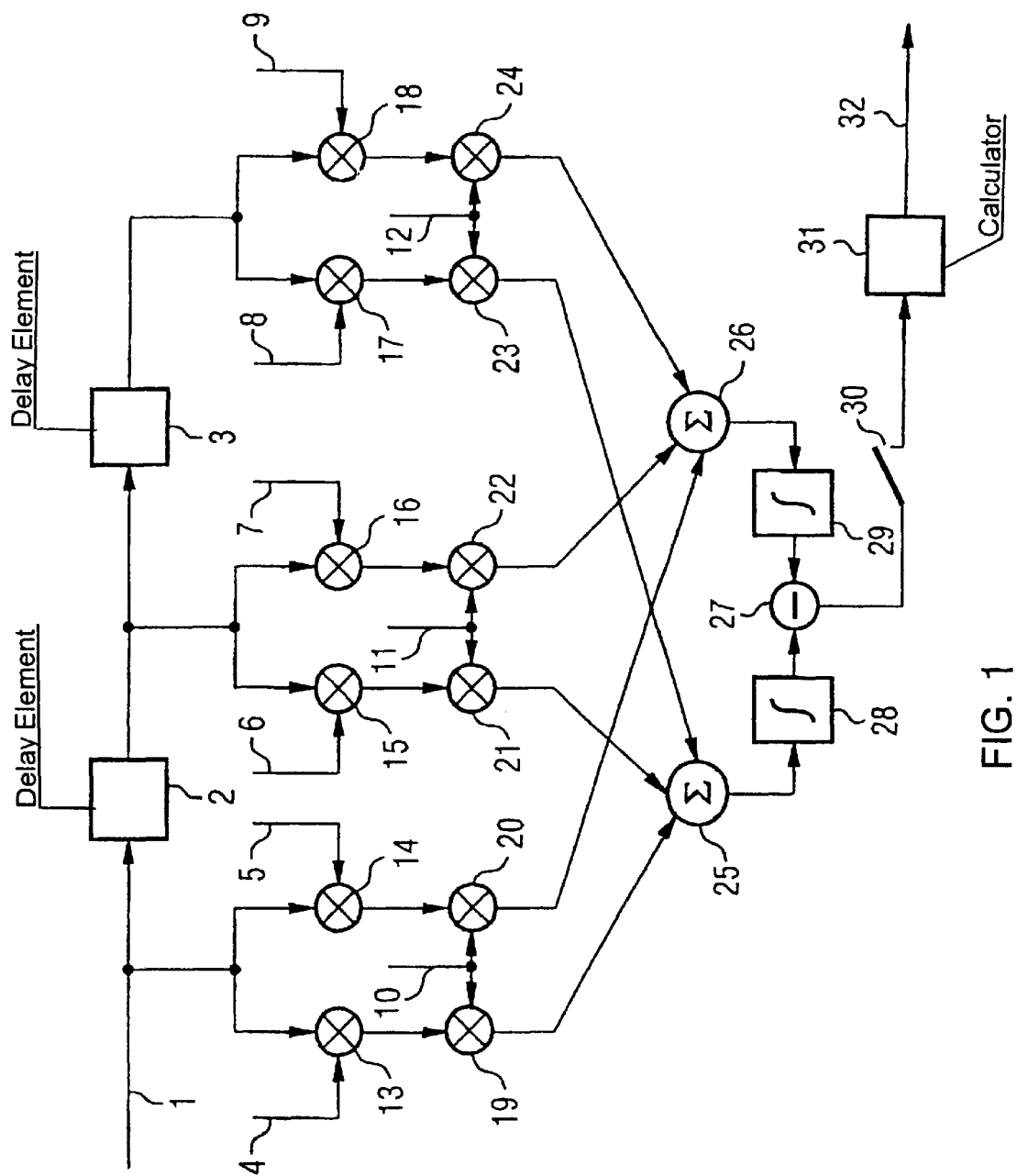
FIG. 1 is a block diagram of an exemplary embodiment of a RAKE receiver that receives and decodes broadband mobile radio signals and carries out the method according to the invention.

Referring now to FIG. 1 in detail, there is shown a transmit signal s(t), having a bandwidth B which is much greater than a coherence bandwidth $B_c$, is sampled and transmitted via a frequency-selective mobile radio channel. The received signal e(t) is then as follows:

$$e(t) = \sum_n h_n(t) \cdot s(t - n/B)$$

Due to the frequency diversity, the transmit signal s(t) is transmitted over n propagation paths. The transfer function of the nth propagation path of the transmit signal is given by $h_n(t)$. The propagation paths are separated with a resolution 1/B, as a result of which the received signal e(t) is composed of a sequence of n signal components arriving with a spacing of 1/B in time, all of which correspond to the transmit signal, multiplied by the corresponding transfer function $h_n(t)$.

To utilize the frequency diversity of broadband signals, RAKE receivers with matched filters or correlators, sampling units and a threshold decision circuit that outputs the detected signal are used. In this configuration, a RAKE receiver is intended to separate a received signal into the individual signal components in accordance with the propagation paths and combine the strongest signal components to form an evaluation signal.

FIG. 1 shows an exemplary embodiment of the RAKE receiver.

A received signal 1 is supplied to a series circuit of a first delay element 2 and a second delay element 3 that delay the signal 1 by 1/B seconds in each case.

The input signal of the first and second delay element 2 and 3, respectively, and the output signal of the second delay element 3 are in each case supplied to a first filter structure 13, 14, 19, 20 and to a second filter structure 15, 16, 21, 22, respectively, and to a third filter structure 17, 18, 23, 24, respectively, and filtered. Each of the filter structures in each case outputs a first filtered signal component and a second filtered signal component. The first and second signal components of the first, second and third filter structures are supplied to a first adder 25 and to a second adder 26, respectively.

The output signal of the first adder 25 and of the second adder 26 is in each case integrated by an integrator 28 and 29, respectively, and then subtracted from one another by a subtracter 27.

The output signal of the subtracter 27 is then sampled by a sampler 30 and supplied to a real-part calculator 31. The real-part calculator 31 calculates the real part of the supplied signal and supplies the real part 32 to a threshold is decision circuit for detecting the signal transmitted via the mobile radio channel.

The first, second and third filter structure are of identical configuration so that only the configuration of the first filter structure will be described in the text which follows.

The signal to be filtered is supplied to a first multiplier 13 and a second multiplier 14. The first multiplier 13 and the second multiplier 14 multiply the supplied received signal 1 by orthogonal fundamental pulses 4 and 5, respectively, which are used for forming a binary pulse. As a result, two signal components are formed from the signal to be filtered.

The two signal components are subsequently supplied to a third multiplier 19 and a fourth multiplier 20, respectively. The two multipliers 19 and 20 multiply the supplied signal component by a first transfer function 10, corresponding to the propagation path of the signal to be filtered, which has previously been determined in a channel estimation.

In the second filter structure 15, 16, 21 and 22, the supplied signal is also multiplied by orthogonal fundamental pulses 6 and 7, respectively, and then by a second transfer function 11 corresponding to the propagation path of the signal to be filtered. This correspondingly applies to the third filter structure 17, 18, 23, 24, multiplying the encoder by a third transfer function 12 corresponding to the propagation path of the signal to be filtered.

The individual signal components of the received signal are picked out of the received signal due to the multipath propagation by delaying the received signal by a number of series-connected delay elements. In the configuration, the received signal should exhibit a delay corresponding to the longest propagation path after passing through the entire series of the delay elements 2, 3. The subsequent multiplication by the orthogonal fundamental pulses filters out the "correct" signal components, i.e. the signal components having the same information. Multiplication by a transfer function $h_n$ (t) corresponding to the propagation path of the respective signal component equalizes the corresponding signal component. In practical embodiments of the RAKE receiver, only the strongest signal components of the received signal are processed for cost reasons.

The RAKE receiver thus utilizes the frequency diversity of a broadband received signal by filtering from the received signal, by transversal filtering, the signal components having the same information. In the configuration, the RAKE receiver must know the parameters of the mobile radio channel or of the propagation paths, respectively, particularly the path weights and transfer functions.

The following method is used for estimating the parameters and, in particular, estimates the propagation paths having the greatest energy component, i.e. those which least attenuate the signals to be transmitted.

In W-CDMA and UMTS mobile radio systems, a synchronization channel via which signals are continuously sent is used for the estimating. In addition, the signals sent via the synchronization channel are known due to an initial synchronization of a mobile radio receiver.

At the beginning of each slot or time slot of the synchronization channel, so-called "primary synchronization codes" and "secondary synchronization codes" are sent which are known to the receiver due to the initial synchronization. The codes are spread by gold sequences.

Each of W propagation paths within the synchronization channel has its own transfer function $h_n$ (t) with n=1, 2, . . . , W. Multiplication of each code with each transfer function and subsequent summation provides the received signal:

$$e_i = \sum_{w=1}^{W} m_{i-w+1} \cdot h_w + n_i$$

where $1<=i<=L_m+W-1$. The function $n_i$ stands for the channel interference occurring during a transmission. $L_m$ specifies the number of chips of the code and is usually 256.

By forming the correlations $$q_j = \sum_{n=1}^{256} e_{j+n-1} \cdot m_n^* = h_j \cdot \sum_{n=1}^{256} |m_n|^2 + z_j$$

where j=1, 2, . . . 128 and $z_j$ is a residual term that interferes with the estimating of the transfer functions $h_j$. The residual term $z_j$ depends, in particular, on the correlation characteristics of the codes. Since gold sequences or gold codes have particularly good cross-correlation characteristics, the residual term becomes negligibly small, especially with these codes, so that the transfer functions $h_j$ can be estimated well from the above equation. This estimate is also called a Tau estimate with correlation.

Figure 2:
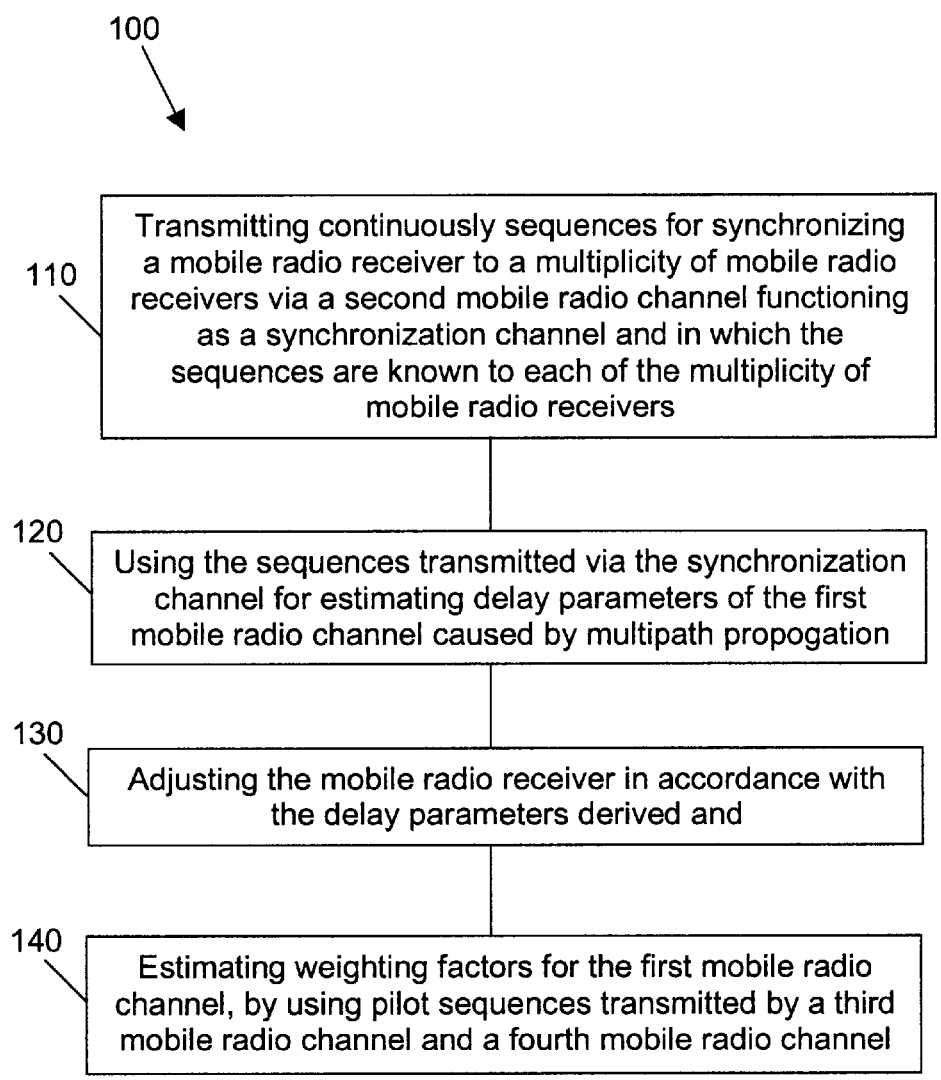
FIG. 2 is a flowchart showing basic method steps of the invention.

FIG. 2 shows the basic steps of a method 100 for estimating a channel impulse response of a first mobile radio channel accessed over a wide bandwidth by use of a code division multiplex method. Step 110 involves continuously transmitting sequences for synchronizing a mobile radio receiver to a multiplicity of mobile radio receivers via a second mobile radio channel functioning as a synchronization channel and in which the sequences are known to each of the multiplicity of mobile radio receivers. Step 120 involves using the sequences transmitted via the synchronization channel for estimating delay parameters of the first mobile radio channel caused by multipath propagation. Step 130 involves adjusting the mobile radio receiver in accordance with the delay parameters derived. Step 140 involves estimating weighting factors for the first mobile radio channel. The weighting factors of the first mobile radio channel can be estimated by using pilot sequences transmitted by a third mobile radio channel and a fourth mobile radio channel.

We claim:

1. A method for estimating a channel impulse response of a first mobile radio channel accessed over a wide bandwidth by use of a code division multiplex method, which comprises the steps of:

continuously transmitting sequences to a plurality of mobile radio receivers for synchronizing a mobile radio receiver via a second mobile radio channel functioning as a downlink synchronization channel and in which the sequences are known to each of the plurality of mobile radio receivers;

using the sequences transmitted via the synchronization channel for estimating delay parameters of the first mobile radio channel caused by multipath propagation;

adjusting the mobile radio receiver in accordance with the delay parameters derived; and estimating weighting factors for the first mobile radio channel by using pilot sequences transmitted via a third mobile radio channel.

2. The method according to claim 1, which comprises using a correlation method for estimating the delay parameters of the first mobile radio channel.

3. The method according to claim 1, which comprises using gold sequences as the sequences transmitted.

4. The method according to claim 1, which comprises carrying out the estimating of the delay parameters of the first mobile radio channel after an initial synchronization of the mobile radio receiver.

5. The method according to claim 1, which comprises carrying out the estimating of the delay parameters of the first mobile radio channel by evaluating strongest signals of signals received.

6. The method according to claim 1, wherein the pilot sequences are transmitted via the third mobile radio channel and a fourth mobile radio channel.

7. The method according to claim 1, which comprises carrying out the estimating of the weighting factors of the first mobile radio channel during an acquisition phase.

8. The method according to claim 7, which comprises using a spread-spectrum code previously used for synchronization for estimating the weighting factors of the first mobile radio channel during the acquisition phase.

9. The method according to claim 6, which comprises carrying out the estimating of the weighting factors of the first mobile radio channel using a pilot integration method.

10. The method according to claim 6, which comprises carrying out the estimating of the weighting factors of the first mobile radio channel using a phase tracking algorithm.

11. The method according to claim 1, which comprises providing a RAKE receiver with adaptive fingers in the first mobile radio receiver, the RAKE receiver being adjusted via the weighting factors of the first mobile radio channel as determined in the step for estimating the weighting factors.

* * * * *